United States Patent
Garvin et al.

(10) Patent No.: US 8,057,165 B1
(45) Date of Patent: Nov. 15, 2011

(54) SENSOR FOR DETECTING HYDROCARBON IN A SEAL

(75) Inventors: Elizabeth D Garvin, Jupiter, FL (US); William S Walsh, Port St. Lucie, FL (US); Elizabeth V Stein, Ft. Lauderdale, FL (US); Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 797 days.

(21) Appl. No.: 12/131,069

(22) Filed: May 31, 2008

(51) Int. Cl.
*F01B 25/26* (2006.01)
*G01M 3/04* (2006.01)

(52) U.S. Cl. ......... 415/118; 415/168.2; 73/40; 250/221; 250/573

(58) Field of Classification Search ................ 415/118, 415/168.1, 168.2, 168.4; 73/23.31, 24.01, 73/40; 137/15.11; 416/61; 250/574; 356/445
See application file for complete search history.

(56) References Cited

U.S. PATENT DOCUMENTS

| | | | |
|---|---|---|---|
| 6,976,679 B2 * | 12/2005 | Goss et al. | 277/347 |
| 6,984,465 B2 * | 1/2006 | Canepa et al. | 429/492 |
| 7,687,270 B1 * | 3/2010 | Crispin et al. | 436/55 |

* cited by examiner

*Primary Examiner* — Edward Look
*Assistant Examiner* — Jason Davis
(74) *Attorney, Agent, or Firm* — John Ryznic

(57) ABSTRACT

A hydrocarbon presence sensor used to detect for the presence of a fuel in a buffer cavity of an inter-propellant seal. A sensor is formed on a rotor shaft in the buffer cavity and an optical imaging device is used to view a change in appearance of the sensor when a hydrocarbon forms on the surface. In one embodiment, the sensor is a coating of porous silicon. In other embodiments, the sensor can be a mirrored or frosted surface on the shaft. A white light source or a laser is reflected off of the sensor and an optical imaging device reads the reflected light to detect for a change in color or intensity of the light to indicate if a hydrocarbon is present on the sensor surface.

17 Claims, 3 Drawing Sheets

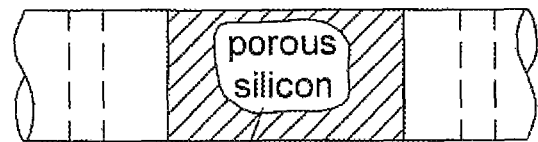
31 Fig 2
32 Fig 3
33 Fig 4
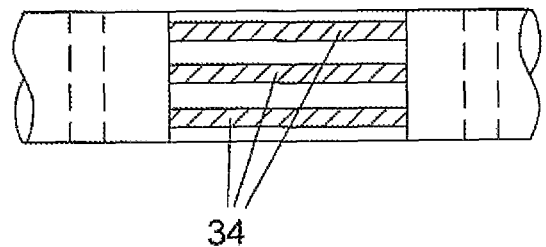
34
Fig 5

SENSOR FOR DETECTING HYDROCARBON IN A SEAL

FEDERAL RESEARCH STATEMENT

None.

CROSS-REFERENCE TO RELATED APPLICATIONS

None.

BACKGROUND OF THE INVENTION

1. Field of the Invention

The present invention relates generally to an inter-propellant seal in a turbopump, and more specifically to a hydrocarbon sensor in the inter-propellant seal.

2. Description of the Related Art Including Information Disclosed Under 37 CFR 1.97 and 1.98

In a rocket engine turbopump, an inter-propellant seal (IPS) is necessary to separate the fuel from the oxidizer. If the two should mix inside the turbopump, they may likely ignite and cause a catastrophic engine failure. Depending on the engine cycle and turbopump configuration, the IPS may be required to separate the fuel rich turbine from the oxidizer pump, such as on the SSME (space shuttle main engine). For a single shaft turbopump, the IPS separates the fuel and the oxidizer pumps.

A typical IPS used in a turbopump is shown in FIG. 1. There are generally at least three discrete seal components. An inert gas, such as helium or nitrogen, is used to provide a buffer or barrier zone between the two propellants. In addition to the seals themselves, the two sources, the two drains and the buffer gas supply require equal attention in design. During operation, the buffer cavity pressure is always maintained higher than either of the adjacent drain pressures in order that the two volatile fluids do not mix. However, in the event that the fluids do mix, the turbopump should be shut down immediately. Currently, the prior art does not have any process involved to determine if the fuel is mixing with the oxidizer in the inter-propellant seal.

A re-usable engine whose fuel is rocket propellant (RP), a higher grade version of kerosene, presents a unique ground support requirement. After the engine has been run once, what is typically done is to maintain the buffer purge flow continuously for 24 hours 7 days per week. This is done because all of the leftover kerosene residue cannot be removed from the pump, and over time this residue may wick between the seals over the oxidizer drain cavity and even to the oxidizer side of the pump. Wicking is when the fluid slowly flows along the surface while sticking to the surface. If one chooses not to continuously run the buffer purge flow, one runs the risk of kerosene wicking to the oxidizer side of the pump and causing a catastrophic failure upon the next use of the engine.

What is currently done is to run the buffer purge flow continuously in-between uses of the engine. If the ground support requirement of continuous buffer purge flow cannot be met, another option is to place some type of a hydrocarbon detection sensor in the oxidizer drain cavity. During the pre-flight checklist, when the purge flow is started the hydrocarbon sensor would detect whether or not kerosene has wicked over to the oxidizer drain cavity. If this has happened, it would require an engine tear-down to clean all the areas of the turbopump where the oxidizer flows.

BRIEF SUMMARY OF THE INVENTION

It is an object of the present invention to detect if the fuel is mixing with the oxidizer in an inter-propellant seal.

It is another object of the present invention to shut down a turbopump if the mixing of the fuel with the oxidizer in the inter-propellant seal is detected.

A hydrocarbon sensor is integrated with an inter-propellant seal used in a turbopump of a rocket engine in order to detect for leakage of the fuel into the oxidizer part of the seal. Several embodiments of the hydrocarbon sensor are disclosed. A first embodiment uses a surface coating applied to the rotor shaft in which the inter-propellant seal forms the seal. The surface of the shaft in the buffer cavity is coated with a porous silicon material that will produce a chemical reaction when a hydrocarbon residue makes contact with the coating. An optical imaging device with an excitation source is used to detect for the chemical reaction indicative of the presence of a hydrocarbon in the buffer cavity.

In another embodiment, the shaft surface is a frosted surface that reflects a white light source and a CCD, or charged-coupled device, that detects the reflective light off of the frosted surface. The sensor detects for a change is surface coloring or reflectivity of the coating to indicate the presence or absence of a hydrocarbon on the shaft surface.

In still another embodiment, a laser projects a light beam to either reflect or refract off of the rotor shaft surface and on to a sensor that is used to detect a change in the light due to the presence or absence of a hydrocarbon on the shaft. The presence of a hydrocarbon fluid on the shaft surface will cause the light from the source to scatter and the intensity of the light picked up by the sensor will be reduced.

In the embodiments of the hydrocarbon sensor, the use of frequency re-composition is used to produce ITT (Fast Fourier Transform) or a fingerprint indicative of the color or intensity of the light received from the reflective surface on the shaft. An array of CCDs is arranged on the sensor surface. Each CCD, or charged-coupled device, produces a frequency indicative of the light received. A graph of all the frequencies produced by the CCDs is plotted and compared to known frequency graphs of the presence or absence of a hydrocarbon on the surface.

BRIEF DESCRIPTION OF THE SEVERAL VIEWS OF THE DRAWINGS

FIG. 2 shows a hydrocarbon sensor of the first embodiment of the present invention.

FIG. 3 shows a hydrocarbon sensor of the second embodiment of the present invention.

FIG. 4 shows a hydrocarbon sensor of the third embodiment of the present invention.

FIG. 5 shows a hydrocarbon sensor of the fourth embodiment of the present invention.

DETAILED DESCRIPTION OF THE INVENTION

Figure 1:
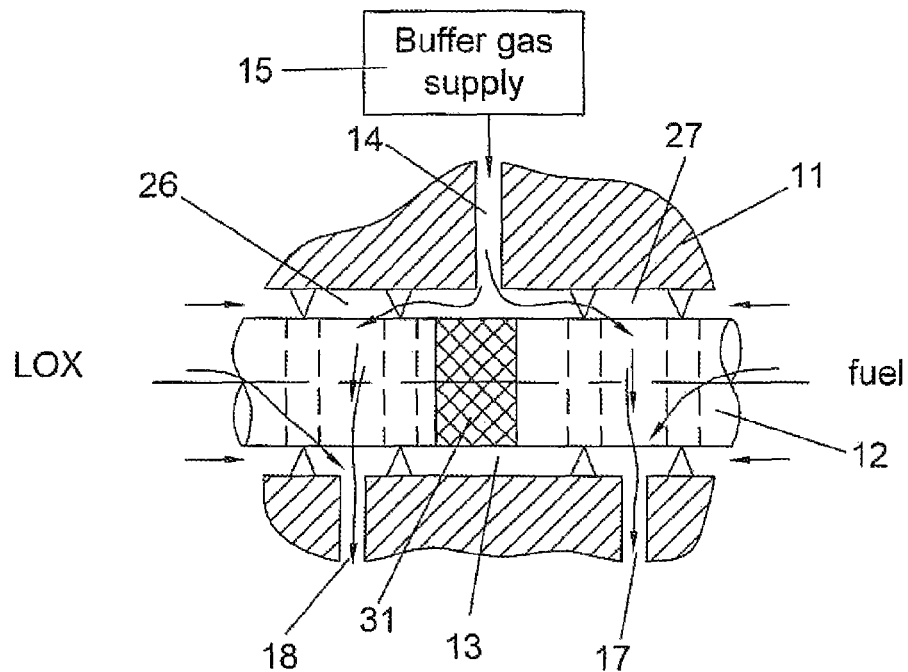
FIG. 1 shows an inter-propellant seal with a hydrocarbon sensor on the shaft of the present invention.

An inter-propellant seal is used in a turbopump of a rocket engine to prevent the mixture of the fuel and the oxidizer. FIG.

1 shows an inter-propellant seal with a rotor shaft 12 of the turbopump supported within the housing 11. The seal includes a buffer cavity 13 with a supply passage 14 to deliver a pressurized buffer gas from a source 15, an oxidizer cavity 26 with an oxidizer drain passage 18 connected to it to remove residue fluid, and a fuel cavity 27 with a fuel drain passage 17 to remove residue fluid. Leakage of the oxidizer will flow into the oxidizer cavity 26 at a lower pressure than the buffer gas supplied to the buffer cavity. Thus, the leakage of the oxidizer through the seal will be driven into the oxidizer drain cavity to prevent mixing with the fuel leakage. The buffer gas from the buffer cavity will also push any fuel leakage through the seal into the fuel drain cavity to prevent the fuel from passing into the oxidizer cavity 26 and react with the oxidizer leakage. A sensor 31 is located on the shaft in the buffer cavity 13 for the detection of any fuel leakage from the fuel cavity 27. The sensor 31 can be one of several embodiments used in the present invention to detect the presence or absence of a hydrocarbon in contact with the shaft 12.

When a hydrocarbon leaks across the seal, the hydrocarbon will travel along the surface of the shaft due to capillary action. Capillary action capillarity, capillary motion, or wicking is the ability of a substance to draw another substance into it. This occurs when adhesive molecular forces between a liquid and a substance are stronger than the cohesive intermolecular forces inside the liquid. The effect causes a concave meniscus to form where the substance is touching vertical surface. The same effect is what causes porous materials such as sponges to soak up liquids. In the turbopump, the hydrocarbon will wick across the fuel seal and into the buffer cavity or even into the oxidizer cavity 26 and react with the oxidizer that leaks across the oxidizer seal. If this occurs, a violent reaction can occur and destroy the turbopump.

In the first embodiment of the hydrocarbon sensor of the present invention in FIG. 2, a coating 31 is placed on the shaft 12 in the buffer cavity 13. The coating 31 is a porous silicon material that changes color due to an exchange of electrons with a hydrocarbon. For use in a cryogenic turbopump, the porous silicon is coated with a hydrocarbon group (CHx) and annealed at 600° C., emitting a strong blue light. In this annealed configuration, the recovery rate is faster, and the recovery time is on the order of a few seconds. A fast recovery rate (of around one second or less) is required for use in the rocket engine turbopump because the pump must be shut down within one second of fuel leakage to prevent further leakage from mixing with the oxygen and producing an explosion. Without a fast detection rate, the detection of a fuel cross-over into the oxidizer cavity would be useless since the resulting mixture and explosion would damage the pump. In the FIG. 2 embodiment, when a hydrocarbon leaks past the seal and into the buffer cavity 13, some of the hydrocarbon will stick to the porous silicon surface 31 and produce a change in the appearance of the sensor 31. An optical sensor can be used to detect for this change in color to determine the presence of hydrocarbon in the buffer cavity 13.

In the second embodiment of the sensor shown in FIG. 3, a mirrored surface 32 is formed on the metal shaft 12 where the coating of the previous embodiment was located. The mirrored surface 32 would be used to reflect light off of the surface 32 of the shaft 12 and into an optical sensor that can detect a change in reflectivity representative of the presence or absence of a hydrocarbon.

A third embodiment of the sensor is shown in FIG. 4 and is a dull or frosted surface 33 formed on the shaft that also reflects light off of the surface and into the optical sensor to detect for a change in appearance of the reflective surface to indicate the absence or presence of a hydrocarbon.

FIG. 5 shows a fourth embodiment of the hydrocarbon sensor in which a number of strips 34 are arranged around the shaft 12 in the buffer cavity 13. The strips 34 can be formed of either one of the previous sensors 31, 32 or 33. Strips 34 of the porous silicon 31, strips of the mirror surface 32, or strips of the frosted surface 33 can be placed on the shaft and an optical sensor used to detect the intensity of the light reflected just like in the previous hydrocarbon sensing systems using the sensors 31, 32, or 33. When no hydrocarbon is present on the strips, the strips and the shaft surface without the strips would reflect light about at the same intensity. When a hydrocarbon is present on the strips 34, and the shaft 12 is rotating, the optical sensor will detect spikes in the reflectivity that indicates movement of the strips 34. In this embodiment with the strips 34 of the sensor material used in the previous embodiment, the rotational speed of the shaft can also be determined when the hydrocarbon is present on the strips.

Figure 6:
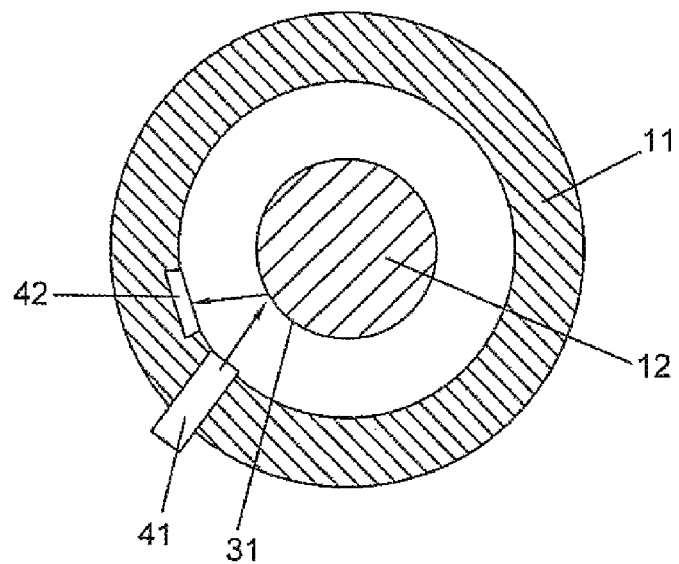
FIG. 6 shows a hydrocarbon sensor with a white light source to detect surface color or reflectivity of the hydrocarbon sensor.

FIG. 6 shows a system that uses either of the sensors 31-34 on the shaft to detect for the presence of a hydrocarbon. The system includes a sensor 31 on the shaft, a white light source 41 (not a laser or an LED) and a CCD array 42 to receive the reflected light off from the sensor 31. The array of CCDs 42 is similar to the CCD that is used in a digital camera in which each CCD reads the light intensity of one pixel. Each signal generated from the CCD will be converted into a frequency with amplitude. Summing all of the frequency/amplitude signals generated will produce a graph with frequency and amplitude on the two axes. A normal response, such as that for an absence of hydrocarbon on the coating, will be represented by a predetermined graph, while the presence of hydrocarbon will be represented by a specific graph that can be compared to the summing result of the CCDs to determine what, if any, amount of hydrocarbon is present on the coating. This array of CCDs could be used to detect changes in color or surface reflectivity in order to detect the presence of a hydrocarbon.

An optical sensor is used in the present invention because it is resistant to electromagnetic noise and is capable of remote control and information transfer through an optical fiber network. If the porous silicon coated with a hydrocarbon group (CHx) and annealed at 600° C. coating is used, then the presence of hydrocarbon on the shaft, and thus the coating 31, would produce a blue reflection with the intensity of the blue depending upon the amount of hydrocarbon sticking to the sensor 31. The CCD array 42 would convert the blue light reflected off of the sensor 31 into a frequency for each CCD and interpret the amount of hydrocarbon present based on the intensity of blue light reflected.

Figure 7:
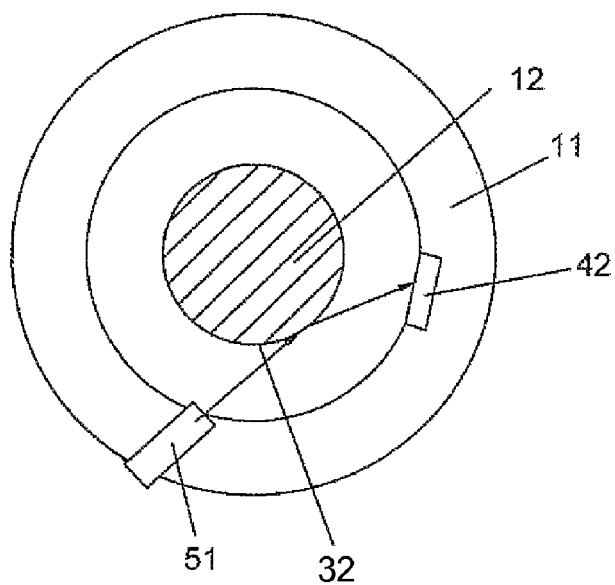
FIG. 7 shows a hydrocarbon sensor with a laser source to detect the intensity of light reflection from the surface.

FIG. 7 shows another embodiment of the hydrocarbon sensing system in which a laser 51 is used to direct a light beam onto the shaft 12 that has a smooth mirror-like surface 32 that will refract the laser beam off of the surface 31 and onto an array of CCDs 42 to receive the reflected laser light. A presence of a hydrocarbon on the surface of the sensor 31 will cause light to scatter and the intensity of light picked up by the CCD array sensor 42 will be reduced. Thus, in this embodiment, the presence and amount of hydrocarbon contained on the surface 31 will be detected by the amount of intensity detect by the sensor 42. The sensor can still be an array of CCDs that detect regular light instead of blue light. The intensity of the regular light or light from the laser will still be read and calibrated to determine the change in intensity that reflects the amount of hydrocarbon present on the surface 31.

Figure 8:
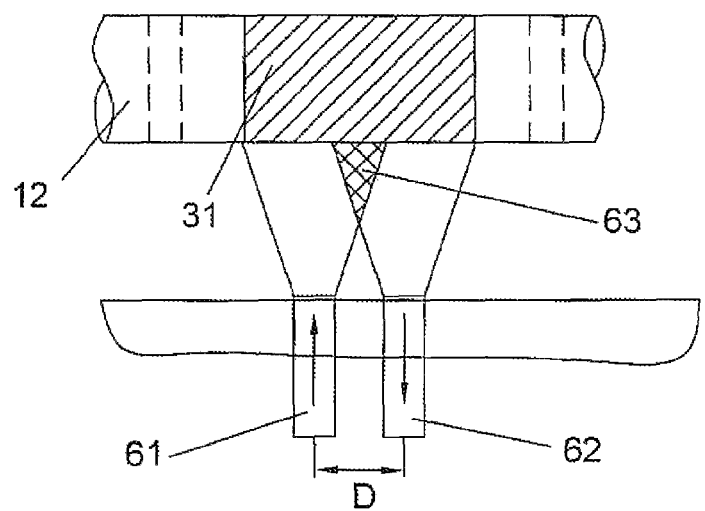
FIG. 8 shows a hydrocarbon sensor that uses a photoluminescence excitation and collector to detect for the presence of a hydrocarbon.

FIG. 8 shows another embodiment of the photoluminescence sensing system in which a sensor 31 of any one of the previous embodiments 31-33 can be used placed on the shaft surface, and a dual band fiber optic cable sensor is used to detect for the presence or absence of hydrocarbon. An excitation source 61 such as a laser projects a beam onto the shaft and a collector 62 receives the reflecting light off of the sensor 31. A region of overlap 63 occurs and it is this overlapping region that is sensed to determine the presence of a hydrocarbon. The photoluminescence of the overlapping region is detected by the collector 62 and processed to detect for the presence of the hydrocarbon.

We claim the following:

1. An inter-propellant seal comprising;
   a rotor shaft rotatably mounted within a housing;
   a buffer cavity;
   a fuel cavity and an oxidizer cavity separated from one another by the buffer cavity such that leakage through the buffer cavity flows into a respective drain cavity; and,
   a hydrocarbon presence sensor secured to the rotor shaft in the buffer cavity.

2. The inter-propellant seal of claim 1, and further comprising:
   the hydrocarbon sensor includes a porous silicon coating.

3. The inter-propellant seal of claim 2, and further comprising:
   the porous silicon is coated with a hydrocarbon group (CHx) and annealed at around 600° C.

4. The inter-propellant seal of claim 1, and further comprising:
   the hydrocarbon sensor includes a mirror surface.

5. The inter-propellant seal of claim 1, and further comprising:
   the hydrocarbon sensor includes a frosted surface.

6. The inter-propellant seal of claim 1, and further comprising:
   the hydrocarbon sensor includes a plurality of strips capable of being used to detect the rotational speed of the rotor shaft.

7. The inter-propellant seal of claim 1, and further comprising:
   an optical imaging device arranged on the housing to view the hydrocarbon sensor; and,
   processing means to detect for a change in the appearance of the hydrocarbon sensor for the presence of a hydrocarbon on the sensor.

8. The inter-propellant seal of claim 7, and further comprising:
   the optical imaging device includes an array of CCDs.

9. The inter-propellant seal of claim 7, and further comprising:
   the optical imaging device includes a white light source directed onto the hydrocarbon sensor on the rotor shaft.

10. The inter-propellant seal of claim 7, and further comprising:
    the optical imaging device includes a laser beam source directed onto the hydrocarbon sensor on the rotor shaft.

11. A hydrocarbon presence sensor comprising;
    a surface sealed from a hydrocarbon;
    a porous silicon coating applied to a portion of the surface; and,
    an optical imaging device arranged to view the coating to detect a change in color of the coating when a hydrocarbon is present on the coating.

12. The hydrocarbon presence sensor of claim 11, and further comprising:
    the porous silicon coating is coated with a hydrocarbon group (CHx) and annealed at around 600° C.

13. The hydrocarbon presence sensor of claim 11, and further comprising:
    the optical imaging device includes an array of CCDs and a white light source.

14. A turbopump for a rocket engine, the turbopump including an inter-propellant seal to prevent mixing of the fuel with the oxidizer, the inter-propellant seal comprising:
    a rotor shaft rotatably mounted within a housing;
    a buffer cavity;
    a fuel cavity and an oxidizer cavity separated from one another by the buffer cavity such that leakage through the buffer cavity flows into the respective drain cavity; and,
    a hydrocarbon presence sensor secured to the rotor shaft in the buffer cavity.

15. The turbopump of claim 14, and further comprising:
    the hydrocarbon sensor includes a porous silicon coating.

16. The turbopump of claim 15, and further comprising:
    an optical imaging device arranged on the housing to view the hydrocarbon sensor; and,
    processing means to detect for a change in the appearance of the hydrocarbon sensor for the presence of a hydrocarbon on the sensor.

17. The turbopump of claim 16, and further comprising:
    the optical imaging device includes an array of CCDs.

* * * * *